(12) United States Patent
Baitz et al.

(10) Patent No.: US 9,457,965 B2
(45) Date of Patent: Oct. 4, 2016

(54) CHECKOUT-SYSTEM ARRANGEMENT

(71) Applicant: WINCOR NIXDORF INTERNATIONAL GMBH, Paderborn (DE)

(72) Inventors: Guenter Baitz, Berlin (DE); Dominik Widmaier, Berlin (DE)

(73) Assignee: WINCOR NIXDORF INTERNATIONAL GMBH (DE)

( * ) Notice: Subject to any disclaimer, the term of this patent is extended or adjusted under 35 U.S.C. 154(b) by 0 days.

(21) Appl. No.: 14/372,886

(22) PCT Filed: Feb. 13, 2013

(86) PCT No.: PCT/EP2013/052827
§ 371 (c)(1),
(2) Date: Jul. 17, 2014

(87) PCT Pub. No.: WO2013/120875
PCT Pub. Date: Aug. 22, 2013

(65) Prior Publication Data
US 2014/0353115 A1    Dec. 4, 2014

(30) Foreign Application Priority Data

Feb. 17, 2012   (DE) ........................ 10 2012 101 267

(51) Int. Cl.
*B65G 43/00*       (2006.01)
*B65G 47/48*       (2006.01)
(Continued)

(52) U.S. Cl.
CPC .............. *B65G 47/48* (2013.01); *A47F 9/047* (2013.01); *G07G 1/0045* (2013.01)

(58) Field of Classification Search
CPC ........ A47F 9/046; A47F 9/047; A47F 9/048; B65G 47/48
USPC ................... 198/367, 367.1, 367.2
See application file for complete search history.

(56) References Cited

U.S. PATENT DOCUMENTS 281,087 A * 7/1883 Lesourd et al. ....... B65G 47/78
                                                     198/359
3,276,563 A * 10/1966 Fitzgerald ............ B65G 47/766
                                                     198/358

(Continued)

FOREIGN PATENT DOCUMENTS

DE       1 429 807        12/1969
DE       197 07 156        9/1997

(Continued)

*Primary Examiner* — William R Harp
(74) *Attorney, Agent, or Firm* — Gerald E. Hespos; Michael J. Porco; Matthew T. Hespos

(57) ABSTRACT

The invention relates to a checkout-system arrangement (10, 100), having an item-acquisition device (12) for acquiring selected items which comprises a scanner (18, 20, 22) for acquiring the items and a first conveyor belt (28) for conveying the items placed on the first conveyor belt (28). Furthermore, a packing device (16) is provided which comprises at least two item-receiving units (32 to 42), which are separate from one another, for receiving the scanned items and for making the items available. Between the first conveyor belt (28) and the packing device (16), a conveying device (14, 114) is provided which comprises a second conveyor belt (30, 130) by means of which, after conveying (28) by means of the first conveyor belt, the scanned items are conveyable to the item-receiving units (32 to 42) of the packing device (16).

14 Claims, 11 Drawing Sheets

(51) Int. Cl.
　　　*G07G 1/00*　　　(2006.01)
　　　*A47F 9/04*　　　(2006.01)

(56) References Cited

U.S. PATENT DOCUMENTS

| | | | | |
|---|---|---|---|---|
| 3,465,870 | A | * | 9/1969 | Paulsen ................ B65G 47/766 198/367 |
| 3,522,874 | A | * | 8/1970 | Schneider ............ B65G 47/487 198/352 |
| 3,688,873 | A | | 9/1972 | Potrafke |
| 3,921,786 | A | * | 11/1975 | Hejmanowski ...... B65G 47/766 198/364 |
| 4,063,632 | A | * | 12/1977 | Neth et al. ..................... 198/374 |
| 4,939,355 | A | * | 7/1990 | Rando et al. ............ 235/462.14 |
| 5,025,477 | A | | 6/1991 | Baitz et al. |
| 5,150,795 | A | * | 9/1992 | Nakayama et al. ........... 209/3.3 |
| 5,358,094 | A | * | 10/1994 | Molinaro et al. .......... 198/502.1 |
| 5,362,949 | A | * | 11/1994 | Gulick .......................... 235/385 |
| 5,439,096 | A | * | 8/1995 | Shigematsu et al. ......... 198/606 |
| 5,609,223 | A | * | 3/1997 | Iizaka et al. ..................... 186/61 |
| 6,186,724 | B1 | * | 2/2001 | Hollander ................ B65G 1/08 193/35 A |
| 7,386,472 | B1 | * | 6/2008 | Bogat ............................. 705/23 |
| 7,648,066 | B2 | * | 1/2010 | Kangas et al. ................. 235/383 |
| 8,783,438 | B2 | * | 7/2014 | Phan et al. ..................... 198/367 |
| 2004/0041021 | A1 | * | 3/2004 | Nugent, Jr. ................... 235/383 |
| 2004/0238326 | A1 | * | 12/2004 | Lichti ................... B65G 1/127 198/475.1 |

FOREIGN PATENT DOCUMENTS

| | | |
|---|---|---|
| DE | 198 57 933 | 7/2000 |
| DE | 103 12 421 | 8/2004 |
| DE | 10 2008 010 642 | 8/2009 |
| EP | 1 746 547 | 1/2007 |
| EP | 2 177 135 | 4/2010 |
| EP | 2 386 227 | 11/2011 |

* cited by examiner

CHECKOUT-SYSTEM ARRANGEMENT

BACKGROUND OF THE INVENTION

1. Field of the Invention

The invention relates to a checkout-system arrangement having an item-acquisition device for acquiring selected items.

2. Description of the Related Art

The known checkout-system arrangement includes an item-acquisition unit that has a scanner for acquiring the items and a first conveyor belt for conveying the items placed on the first conveyor belt past the scanner. The checkout-system arrangement furthermore comprises a packing device that has at least two item-receiving units, which are separate from one another, for receiving the items acquired by means of the scanner and for making the items available for retrieval by a customer. Such checkout-system arrangements are known from points of sale, in particular from retail outlets and from supermarkets, in which in each case a multiplicity of customers in each case purchase a multiplicity of selected items that are acquired by a checkout-system arrangement and, after acquisition, are made available to the customer for retrieval. Known checkout-system arrangements are disclosed in EP 2386227 A1, DE 10312421 B3 and EP 0338376 B1.

The related art also includes what are termed self-checkout systems in addition to the checkout-system arrangements in which the items are acquired by a checkout operator and in which the checkout operator handles the payment procedure. In the self-checkout systems, acquisition of the items takes place automatically or by the customer by means of a scanner and the payment procedure likewise takes place without involving any checkout operator. These known checkout-system arrangements have a packing table as a packing device. The packing table is arranged at the end of a conveyor belt that conveys the items from the scanning region to the packing table. Such a packing table may have at least two item-receiving units that are separate from one another. Thus, the items of two customers being successively processed at the checkout-system arrangement can be separately received.

So-called tunnel scanners for the automatic acquisition of selected items are known in which the items are conveyed on a conveyor belt along the scanner that is arranged around the conveyor belt, so that the items can be acquired by means of the tunnel scanner. Typical tunnel scanners have first and second conveyor belts. The first conveyor belt conveys the items into the scanning region and is referred to as a leader belt. The second conveyor belt conveys the items out of the scanning region and is referred to as a return belt. A gap exists between the two conveyor belts, such that, in this gap, the scanning arrangement can also acquire from below the items being conveyed through the scanning region.

In the case of checkout-system arrangements having tunnel scanners, high flexibility is desirable in the design of the two conveyor belts that are arranged at least in part in the scanning region and in the design of the packing device, in order for the checkout-system arrangement to be adapted readily to the local conditions and the requirements of the respective points of sale. The design of the packing concept of the checkout-system arrangement here depends on the planned process of the respective wholesale or retail outlet and has to be adapted to its requirements. Specifically in the case of high scanner speeds the packing devices are often the bottlenecks of the entire system, since insufficient space is available for a plurality of customers having checkout baskets of different sizes. Additionally, often a plurality of checkout-system arrangements have to be adapted to the available space.

It is the object of the invention to provide a checkout-system arrangement that is readily adaptable to the respective requirements.

SUMMARY OF THE INVENTION

According to the invention, a conveying device is provided between the first conveyor belt and a packing device and comprises a second conveyor belt, by means of which, after conveying by the first conveyor belt, the scanned items are conveyable to an item-receiving units of the packing device. On account thereof, a flexible arrangement and a flexible potential for adapting the item-receiving units to the requirements of customers and to the requirements of the respective wholesale or retail outlet of the respective market points of sale in which the checkout-system arrangement is to be set up are readily possible. In particular, the provision of the second conveyor belt enables both the arrangement of the packing device in relation to the item-acquisition device as well as the size and the number of item-receiving units of the packing device to be readily adapted to the requirements of the market and to the local conditions, without having to modify the construction of the item-acquisition device.

The packing device and the conveying device of the item-acquisition device preferably are configured as separate modules. On account thereof, simple and cost-effective adaptation to the local conditions and the requirements of the market are very readily possible.

The modules preferably are interconnectable with one another by way of releasable and reinstatable connectors by means of provided interfaces. Thus, different modules can be connected readily to form a checkout-system arrangement. Also, the releasable and reinstatable connectors enable ready reconfiguration of the respective checkout-system arrangement. In particular easy exchange of the packing device and of the conveying device is possible in order for those to be adapted to changed market requirements, if applicable. Also, the item-acquisition device can readily be exchanged for another item-acquisition device having another range of functions or having another acquisition speed. Also in the case of servicing, only individual modules can therefore be exchanged for modules of the identical specification.

It is furthermore advantageous for the first conveyor belt to be driven so that items lying thereon are conveyed in a first direction, and for the second conveyor belt to be driven so that items lying thereon are conveyed in a second direction. For modifying the orientation of the first and second directions relative to one another, the orientation of the conveying device relative to the item-acquisition device is modifiable. Therefore, a flexible arrangement of the item-acquisition device relative to the packing device and to the conveying device is possible, such that the checkout-system arrangement can readily be adapted to the requirements of the respective market. In this embodiment, in a first operating position, the item-acquisition device and the conveying device may be arranged so that the first direction and the second direction are identically oriented. The first conveyor belt and the second conveyor belt preferably are arranged behind one another. Additionally or alternatively it is possible in the case of this embodiment that, in a second operating position, the item-acquisition device and the conveying device are arranged so that the first direction and the second direction are orthogonal to one another. On account thereof a flexible arrangement of the item-acquisition device relative to the conveying device depending on the requirements of the respective market is possible.

It is furthermore advantageous for the packing device to be arranged on one side of the conveying device, along the longitudinal direction of the second conveyor belt. Thus, the items that are being conveyed by the second conveyor belt can readily be directed into one of the item-receiving units that are provided to the customer there for retrieval by means of suitable deflection elements.

It is particularly advantageous for the packing device to comprise a plurality of mutually interconnectable and mutually separable sub-modules, wherein each sub-module comprises at least one item-receiving unit. Therefore, different numbers of the sub-modules can be combined to form a packing device that can be combined with a correspondingly long conveyor belt. In the case of this embodiment only at least one type of item-acquisition device, at least one type of a sub-module and a plurality of types of conveying devices need to be provided for checkout systems having various requirements, so that it is possible for the checkout-system arrangement to adapt to different requirements, to the number and to the arrangement of a plurality of item-receiving units.

In one preferred embodiment, in relation to the second direction, the item-receiving units are arranged behind one another. Thus, the items can readily be directed from the second conveyor belt into any selected item-receiving unit. Also on account of such an arrangement it is possible to differentiate between a customer side and an operator side in the event that, for assisting the customers and/or for collecting the calculated monetary amount, an operator is provided with the checkout-system arrangement.

It is furthermore advantageous for the at least two item-receiving units of the packing device to be separated from one another by a movable separation wall. Thus the receiving volume of the item-receiving units is modifiable by moving the separation wall. Embodiments in which the separation wall is displaceable to the extent or lowerable in such a manner that at least two receiving units provide a common item-receiving region are also possible. On account of this embodiment flexible utilization of the item-receiving regions for customer checkout baskets of various sizes is possible. Therefore, the item-receiving units of the packing device may also be adapted, in principle, to market requirements by way of a one-off configuration of the item-receiving regions. In particular item-receiving regions of different sizes that are then selected in a suitable manner by an operator or by a control unit may be provided here for customer checkout baskets of different sizes.

It is particularly advantageous for the item-acquisition device to have a tunnel scanner as a scanner. Such a tunnel scanner, in particular by means of mirror arrangements, may acquire a plurality of sides of the items being conveyed through the scanning region and acquire barcodes and/or other features of the items located there. Such a tunnel scanner, in particular, can sweep the entire periphery of an item about its conveying direction through the scanning region, i.e. can sweep all four sides of a rectangular item being conveyed through the scanning region where the four sides are arranged about the conveying direction. By way of suitable mirror arrangements those sides of the rectangular item that intersect the conveying direction (i.e. the front and rear sides of the item, when seen in the conveying direction) may also be acquired, so that an item that is being conveyed through the scanning region of the tunnel scanner can be acquired from all sides. As described in the description of the prior art, a tunnel scanner, to this end, may have a leader belt for conveying the items into the scanning region and a return belt for conveying the items out of the scanning region. When a tunnel scanner is used in conjunction with the checkout-system arrangement of the invention, the return belt is the conveyor belt referred to as the first conveyor belt. Alternatively or additionally the scanner may have an RFID reader unit that reads RFID transponders and/or RFID tags located on the items and, proceeding from the read data, obtains information about the items to be acquired.

It is furthermore advantageous for the first conveyor belt and the second conveyor belt to be arranged relative to one another so that they partially overlap in a transition region in which the items are transferred from the first conveyor belt to the second conveyor belt. On account thereof safe conveying of the items from the first conveyor belt to the second conveyor belt is possible without there being any backlog of items in the transition region.

In a further advantageous embodiment, the first conveyor belt and the second conveyor belt are arranged relative to one another so that, in a transition region in which the items are transferred from the first conveyor belt to the second conveyor belt, the second conveyor belt is lower than the first conveyor belt. In particular, the second conveyor belt, in the transition region, is arranged lower than the first conveyor belt by the deflection radius of the first conveyor belt. On account thereof, a smaller distance between the first conveyor belt and second conveyor belt can only be provided in the transition region, so that the risk of items making their way between the first and the second conveyor belt in this transition region and being damaged by the rotation of the first and/or second conveyor belt or of a backlog of items occurring in the transition region is reduced. On account of a comparatively small height differential, careful handling of the acquired items is also ensured. On account of the height differential, the acquired items drop from the first conveyor belt onto the second conveyor belt. In this embodiment and in all other embodiments the belts may be implemented as driven endless belts that are in each case guided around at least two deflection rollers. The second belt here may be arranged lower by at least the radius of that deflection roller of the first conveyor belt that is arranged close to the second conveyor belt. The height differential preferably is the sum of the radius of the deflection roller and the belt thickness of the first conveyor belt. Therefore, a reliable transition of the acquired items from the first conveyor belt to the second conveyor belt is made possible.

In a further advantageous embodiment the first conveyor belt and the second conveyor belt are transverse to one another. In the transition region inside the internal angle that is formed by the conveyor belts, at least one roller that is mounted so as to be rotatable about its longitudinal axis is provided for deflecting the items during transfer from the first conveyor belt to the second conveyor belt. As an alternative to a freely rotatable roller the roller may also be driven by a drive unit. The circumferential speed of the driven roller preferably corresponds to the conveying speed of the first and/or second belt, i.e. to its circumferential speed. It is furthermore advantageous for the longitudinal axis of the roller to be orthogonal to the conveying planes of the belts. Thus, a simple deflection of the items about the roller is possible in the transition from the first conveyor belt to the second conveyor belt. The indicated orientations of the belts in general refer in each case to their longitudinal axis.

It is furthermore advantageous for the item-acquisition device and the conveying device to be arranged so that the longitudinal axes of both conveyor belts are identically oriented and for the scanning region of the scanner to be arranged at the end of the first conveyor belt, such that the items, immediately after acquisition by the scanner, are transferred from the first conveyor belt to the second conveyor belt. As a result, a particularly compact construction method is possible, since the first conveyor belt already terminates at the end of the scanning region. Alternatively, the first belt may project beyond the end of the tunnel and may convey the items past the scanner. As already mentioned, however, the item-acquisition device may also comprise a leader belt and a return belt, wherein the leader belt conveys the items into the scanning region and the return belt conveys the items out of the scanning region.

It is particularly advantageous for the checkout-system arrangement to additionally have a rack for displaying items, for the rack to be arranged on a first longitudinal side of the conveying device and for the packing device to be arranged on a second side of the conveying device that is opposite the first side. It is particularly advantageous for the rack to be arranged at a distance from the conveying device and for the packing device to be arranged directly adjacent to the conveying device. In particular items that are reserved for customers or bags that have been deposited by the customers when entering the market may be stored in the rack. Alternatively or additionally items, in particular very high-value items, may be displayed in this rack. It is furthermore particularly advantageous for the item-receiving units to be configured as packing trays that are arranged in a downward-sloping manner, such that the items in the downward-sloping packing trays may slide away from the second conveyor belt. Alternatively or additionally the packing trays may be arranged to be lower than the second conveyor belt. The items are thus conveyed away from the conveyor belt in a simple manner and do not compromise conveyor belt motion.

Deflection elements may be provided for the selective filling of one of the at least two provided item-receiving units by the second conveyor belt conveyed items. These deflection elements may be turnout-like elements or may be implemented as pushers. Such a pusher, by way of an actively guided motion, pushes items conveyed on the second conveying path into an item-receiving region of the packing device. Thus, a simple diversion of the items from the second conveyor belt into a selected item-receiving region provided by the item-receiving units is readily possible.

The conveying device may have at least a third belt for extending the conveying path provided by the second conveyor belt. A plurality of conveying device modules may be provided. Each conveying device module may comprise one conveyor belt and the conveying device modules preferably are interconnectable to one another by way of releasable and reinstatable connectors, in particular by way of a provided interface. The checkout-system arrangement may furthermore comprise at least one display unit, at least one money-insertion and money-disbursement region, at least receipt printers and/or at least one card reader unit, which preferably are arranged in the region of the conveying device at least in part below the conveyor belt. Furthermore, in one advantageous embodiment the running direction of the first belt is reversible, such that items that have not been successfully acquired by means of the item-acquisition unit can, once again, be fed to the scanner of the item-acquisition unit.

In the case of all embodiments it may be provided that an item-receiving unit for items that have not been acquired and/or scanned by the item-acquisition device exists into which these non-acquired and/or non-scanned items are conveyed by the conveying device and, if applicable, by the deflection elements. This item-receiving unit is preferably remotely arranged from the further item-receiving units. On account thereof, separation of the non-acquired items from the correctly acquired items may preferably take place automatically. By way of a suitable remote arrangement, access to the items in this remotely arranged item-receiving unit by a customer-service or checkout operator preferably is facilitated in comparison to access to the items located in the other item-receiving units, whereas access by a customer to this remotely arranged item-receiving unit into which the non-acquired items are conveyed is impeded in comparison to the other item-receiving units into which the acquired items to be retrieved by the customer are conveyed.

However, should there be no special item-receiving unit for a later separation of non-acquired items, attention may be drawn to the non-acquired items by way of a "negative acknowledgement" that preferably comprises a low-frequency sound and/or a visual warning signal, for example via a display or an in particular red signal lamp. Alternatively or additionally the conveyor belt of the conveying device may also be stopped after conveying the item up to an access region of a customer-service or checkout operator to enable access to the non-acquired item by the customer-service or checkout operator. On account thereof the customer and/or the customer-service or checkout operator can be made aware of an acquisition error in a suitable manner. On account of this "negative acknowledgement" any non-acquired item can be manually re-acquired in a targeted manner by the customer and/or a customer-service or checkout operator.

Further features and advantages of the invention are derived from the following description which explains the invention in more detail by means of exemplary embodiments in conjunction with the appended figures.

DETAILED DESCRIPTION OF THE
PREFERRED EMBODIMENTS

Figure 1:
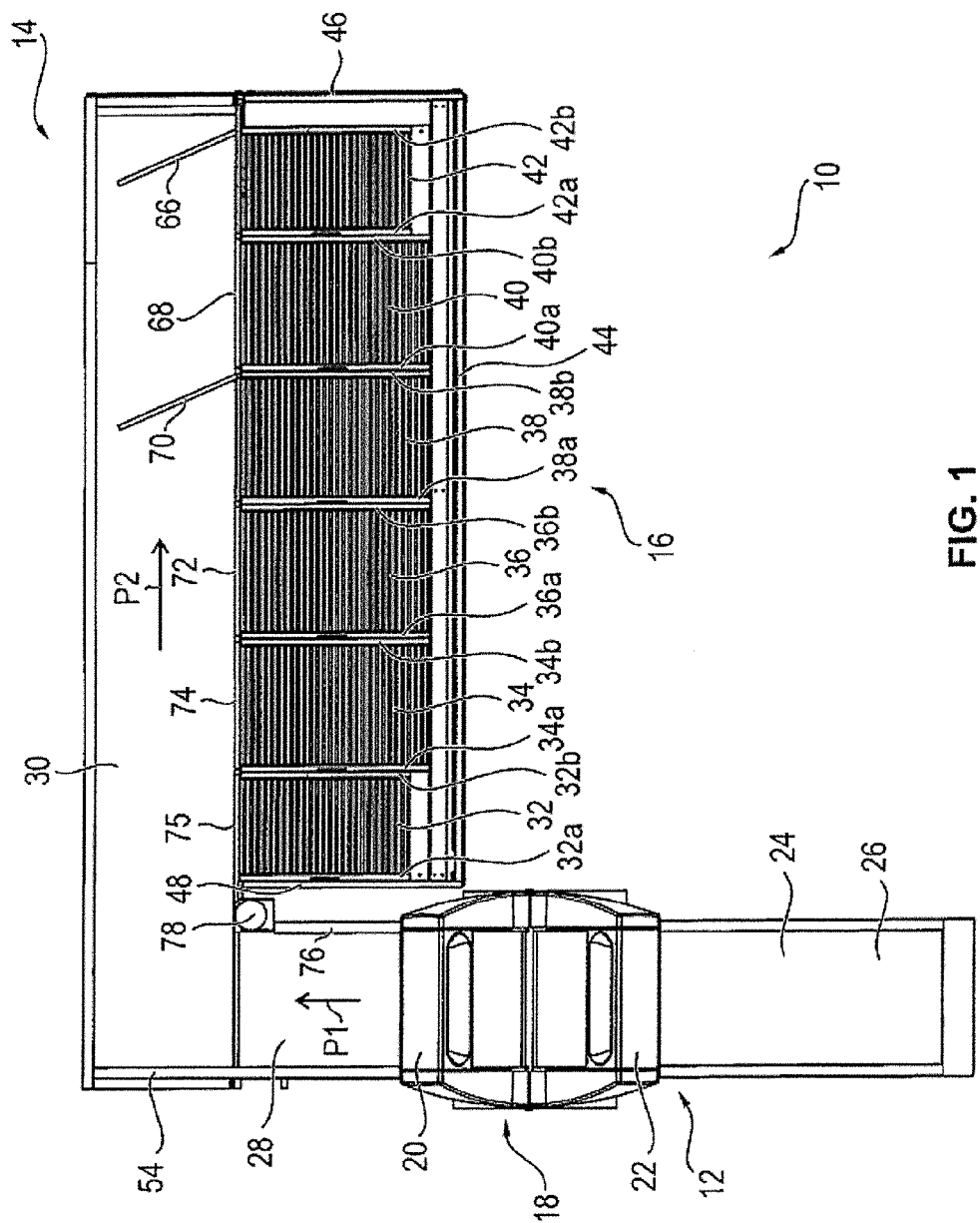
FIG. 1 is a plan view of a checkout-system arrangement according to a first embodiment.

FIG. 1 shows a plan view onto a checkout-system arrangement 10. The checkout-system arrangement 10 comprises a plurality of modules, namely an item-acquisition device 12, a conveying device 14, and a packing device 16. The modules 12, 14, 16 are interconnected to one another by means of releasable and reinstatable connectors, which are configured as interfaces, to form a checkout-system arrangement 10. The item-acquisition device 12 has a scanning unit 18 for acquiring the items which are fed by the scanning unit 18. The scanning unit 18, in the present exemplary embodiment, comprises two barcode readers 20, 22 which, by means of mirror arrangements which are assigned to the barcode readers 20, 22, sweep an item being conveyed through the scanning region from all sides. In other embodiments, the scanning unit 18 may also have only one single barcode reader. Alternatively or additionally to the barcode reader(s) 20, 22 the scanning unit 18 may also comprise an optical camera, a weighing machine and/or an RFID reader for acquiring RFID tags or RFID transponders which are attached to items. By means of the weighing machine quantities of items acquired or the weight of acquired items can be compared with a preset weight for the item in each case, such that by means of the barcode reader(s) 20, 22 or the result of the item acquisition determined by means of the RFID reader are verified. The camera may be utilized in the same manner as the weighing machine for verifying the results determined by means of the barcode reader 20, 22 and/or the RFID readers or alternatively for the actual acquisition of the item, wherein by means of the camera either a barcode which is attached to the item is detected and evaluated or by means of image analysis the item conveyed through the scanning region of the scanning unit 18 is identified and the identified item is registered by the checkout-system arrangement 10.

The item-acquisition device 12 has an infeed region 24 in which a customer or a customer-service operator places the items to be acquired by the checkout-system arrangement 10 onto a leader belt 26. The leader belt 26 is a driven, endless, revolving conveyor belt by means of which the items infed in the infeed region 24 are conveyed into the scanning region of the scanning unit 18. The item-acquisition device 12 furthermore comprises a return belt 28 which is implemented as a driven, endless, revolving conveyor belt and which conveys the items acquired by the scanning unit 18 out of the scanning region of the scanning unit 18 and feeds them to a conveyor belt 30 of the conveying device 14. The conveying direction P1 of the return belt 28 and the conveying direction P2 of the conveyor belt 30 of the conveying device 14 run orthogonally to one another, wherein the conveying direction P1 of the return belt 28 is reversible in order to be able to convey incorrectly acquired items back into the scanning region, if and when required. It is particularly advantageous if the conveying directions of the return belt 28 and of the leader belt 26 are simultaneously reversed in order to avoid a backlog of items in the scanning region of the scanning unit 18.

The packing device 16 comprises a plurality of item-receiving units 32 to 42 which are separated from one another and implemented as packing trays. In relation to the conveying direction P2 of the conveyor belt 30, the item-receiving units 32 to 42 are arranged behind one another, wherein each item-receiving unit 32 to 42 is implemented as a sub-module of the packing device 16, said sub-modules being combined by way of connecting elements to form an entire module. The connecting elements 44, 46, 48 by means of which the sub-modules 32 to 42 are combined to form the packing device 16 are illustrated in FIG. 1. The item-receiving units 32 to 42 are directly adjacent to one side of the conveyor belt 30 of the conveying device 14 and comprise in each case a sloped plane which is arranged in such a manner that the items which are directed by means of deflection elements 66 to 75 from the conveyor belt 30 into the respective item-receiving unit 32 to 42 slide down the sloped plane of the selected item-receiving unit up to a retrieval region of the item-receiving unit 32 to 42, from where a customer or a customer-service operator may readily retrieve the items. On account of the sloped plane the items, without being actively driven, are directed away from the conveyor belt 30 into the item-retrieval region item-receiving unit 32 to 42. The sloped plane may have a compact surface or be formed by rollers.

The item-receiving units 32 to 42 have in each case lateral separation walls 32a to 42d of which at least part of the separation walls 32b, 34a to 42a arranged between the individual item-receiving units are arranged in a movable manner, wherein by moving the separation walls 32b, 34a; 34b, 36a; 36b, 36a; 38b, 40a; 40b, 42a arranged between two item-receiving units the receiving volume of the item-receiving units is modifiable. In particular, the item-receiving region of two adjoining item-receiving units 32 to 42 may be combined to form a common item-receiving region. This combination of item-receiving regions of a plurality of item-receiving units 32 to 42 may take place automatically depending on the amount of items of a checkout transaction acquired by means of the scanning unit 18 or be preset for a market according to the usual pattern of items.

The deflection elements 66 to 75, in the checkout-system arrangement 10, are connected to the packing device 16. The respective longitudinal axis of the deflection elements 66 to 75 is and its longitudinal axis, in a first position, is oriented parallel to the conveying direction P2 of the conveyor belt 30, such that the deflection elements 66 to 75, in this first position, laterally delimit the conveyor belt 30 in the direction of the item-receiving units 32 to 42 and block access to the item-receiving units 32 to 42, such that in this closed state no items may make their way from the conveyor belt 30 into the item-receiving region of the respective item-receiving unit 32 to 42. In a second position these deflection elements 66 to 75 are arranged so as to be rotated about their rotation axis, such that they intersect the longitudinal axis of the conveyor belt 30 in an oblique or orthogonal manner. On account thereof the items conveyed by the conveyor belt 30 in the conveying direction P2 are directed by means of the deflection element 66 to 75 into a selected item-receiving unit. In FIG. 1 the deflection elements 68, 72, 74, 75 are illustrated in the first closed position and the deflection elements 66, 70 in an intermediate position between the first position and a second opened position. The deflection elements 68 to 75 function as a type of turnout. The deflection elements 68 to 75 may be manually moved by a customer-service operator or a customer or, if corresponding drives are provided, may be automatically moved between their respective first and second position by the checkout-system arrangement 10.

The checkout-system arrangement 10 has a roller 78 which in a transition region in an internal angle formed by the conveyor belts 28, 30. The roller 78 is rotatably mounted and serves for deflecting items which are being conveyed from the return belt 28 onto the conveyor belt 30. In the present exemplary embodiment the roller 78 is implemented as a passive rotatable roller. In other exemplary embodiments, however, the roller 78 may be driven by means of a drive unit. The circumferential speeds of the return belt 28, the conveyor belt and of the roller 78 then are preferably identical. The longitudinal axis of the roller 78 preferably runs orthogonally to the conveying direction P1 and to the conveying direction P2 and thus orthogonally to the conveying planes of the belts 28, 30. The transition of items from the return belt 28 onto the conveyor belt 30 is facilitated by the roller 78, such that a backlog of items in the transition region between the return belt 28 and the conveyor belt 30 as well as damage to the items in this transition region are avoided.

Figure 2:
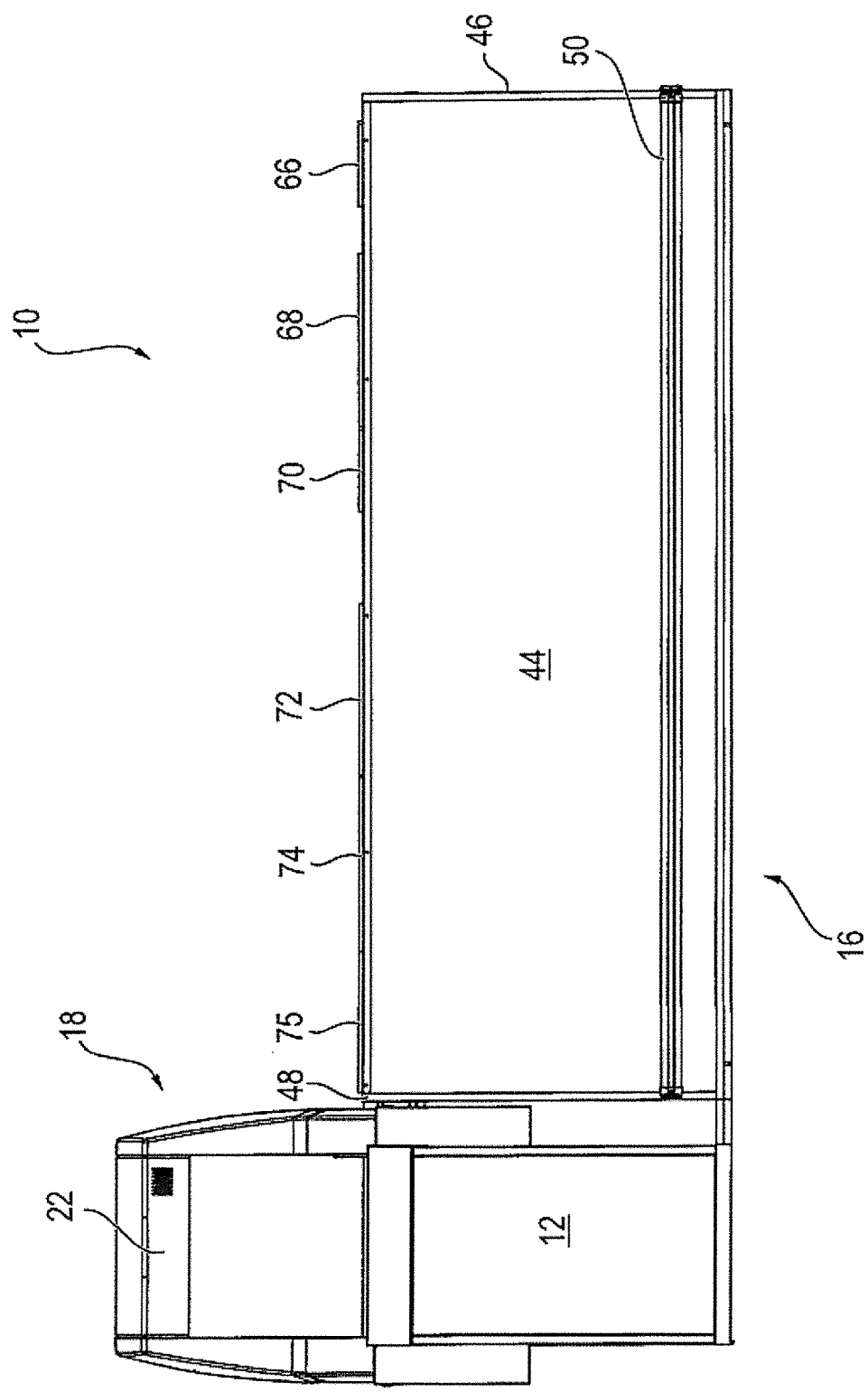
FIG. 2 is a front view of the checkout-system arrangement of FIG. 1.

FIG. 2 shows a front view of the checkout-system arrangement 10 as per FIG. 1. The packing device 16 comprises an impact protection bar 50 which is illustrated in FIG. 2 and which serves as impact protection for shopping carts in order to avoid damage to the packing device 16.

Figure 3:
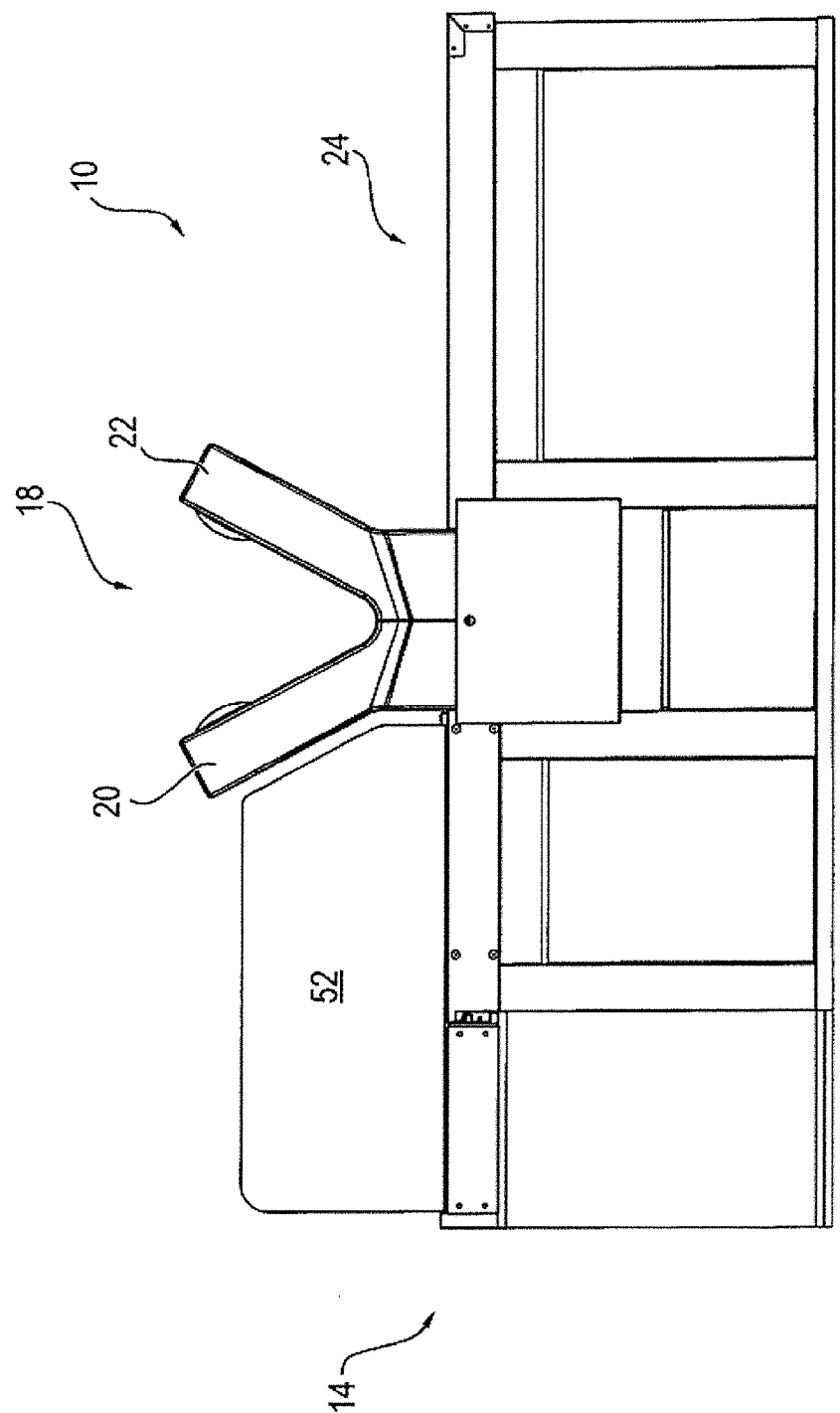
FIG. 3 is a side view of the checkout-system arrangement of FIGS. 1 and 2.

In FIG. 3 a side view of the checkout-system arrangement 10 is shown, wherein a common separation element 52 is provided in the transition region between the item-acquisition device 12 and the conveying device 14. This separation element 52 serves, in particular, as access protection for the items which have already been acquired by the scanning unit 18 of the item-acquisition device 12. As can be seen in FIG. 2 the scanners 20, 22 form a closed region around the leader belt 26 and around the return belt 28. For this reason, such a scanning unit 18 is also referred to as a tunnel scanner.

The separation element 52, in other embodiments of the invention, may also be implemented in another manner, for example from a first separation-element segment, which is connected to the item-acquisition device 12, and from a second separation-element segment, which is connected to the conveying device 14. However, in this embodiment or in other embodiments, the separation element 52 may also be dispensed with.

Figure 4:
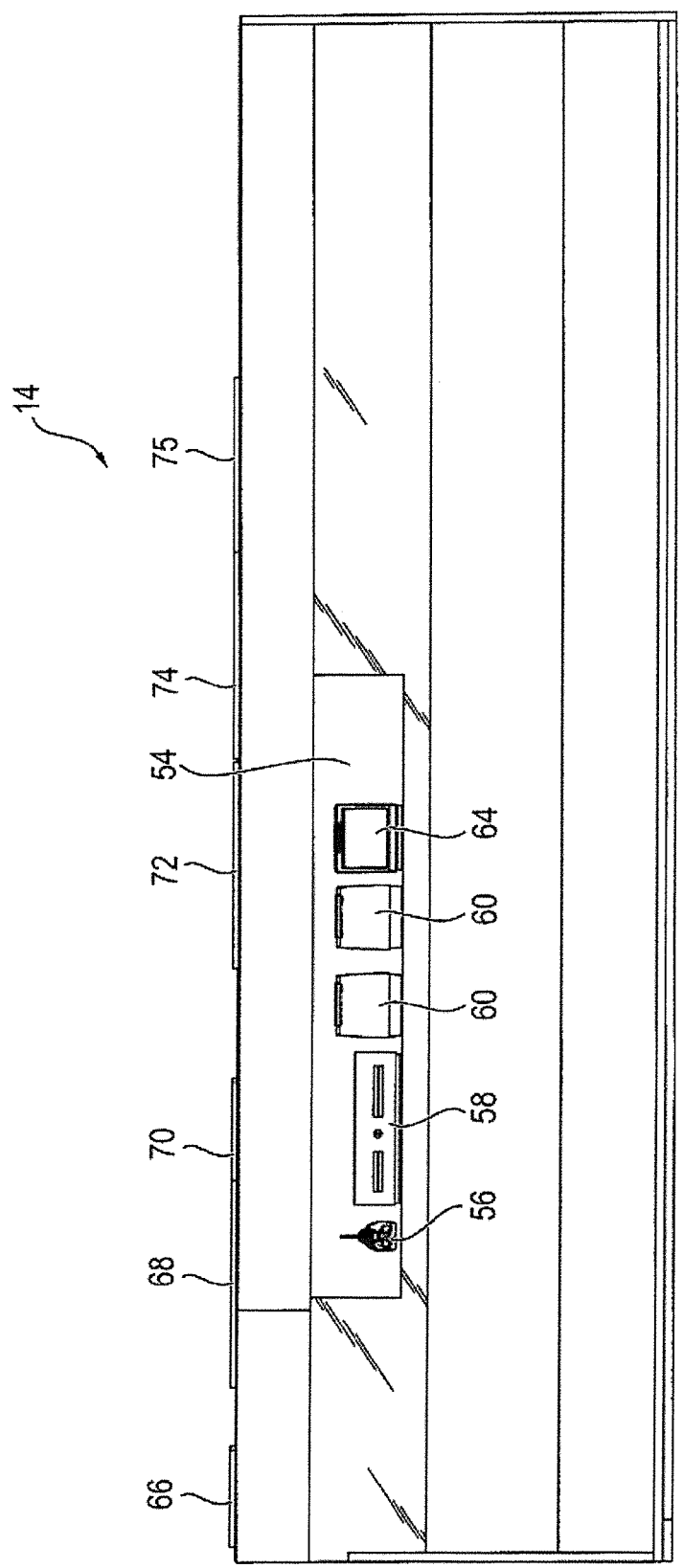
FIG. 4 is a rear view of the checkout-system arrangement of FIGS. 1 to 3.

In FIG. 4 a rear view of the conveying device 14 and of the packing device 16 is illustrated. A compartment 54 in which, in the present exemplary embodiment, a hand-held scanner 56, a checkout drawer 58, two printers 60, 62, wherein the printer 60 is implemented as a receipt printer and the printer 62 as a coupon printer, and a display 64 are arranged is provided in the rear side of the conveying device 14. Additionally to the display the checkout-system arrangement 10 may comprise a customer display (not illustrated) as well as a terminal for non-cash payments and/or card-reader units for acquiring further cards, such as discount cards, customer cards and similar. Furthermore the already mentioned deflection elements 66 to 75 are readily visible in FIG. 4.

Figure 5:
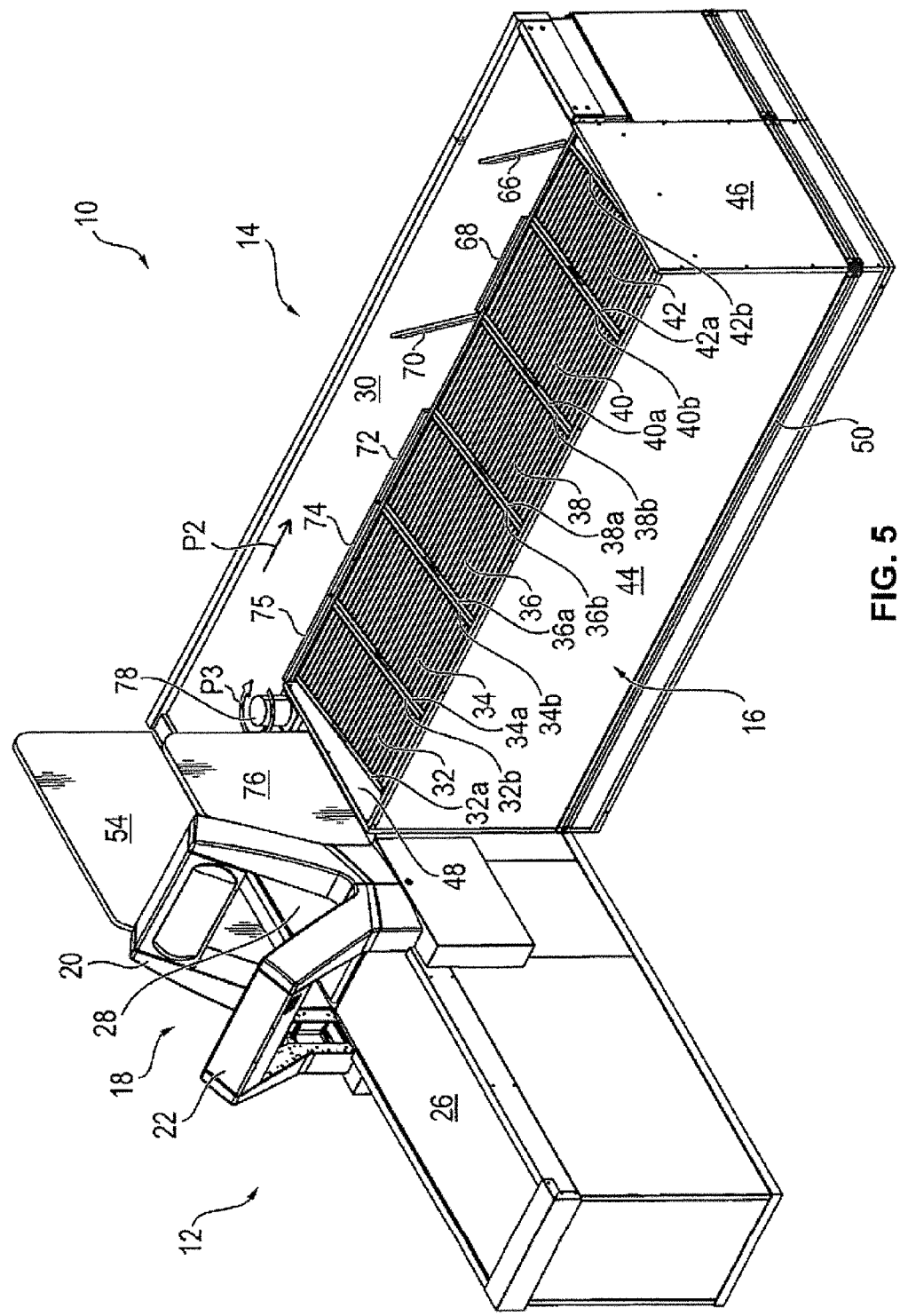
FIG. 5 is a perspective illustration of the checkout-system arrangement of FIGS. 1 to 4.

FIG. 5 shows a perspective illustration of the checkout-system arrangement 10, wherein in FIG. 5 a further separation element 76, which is arranged in a part-region opposite the first separation element 54 and, in particular in the case of a backlog of items in the region following the scanning unit 18, prevents lateral breaking out of the items, is visible, such that the separation element 54 prevents already scanned items from falling down and the separation element 76 prevents already scanned items from unintentionally making their way into the item-receiving region of the item-receiving unit 32.

In FIG. 5 the rotation direction of the roller 78 is indicated by the arrow P3, wherein driving of the roller 78 takes place by way of contact with the items being conveyed by means of the return belt 28 and of the conveyor belt 30. Alternatively the roller 78 may also be actively driven in the direction of the arrow P3 by means of a drive unit.

Figure 6:
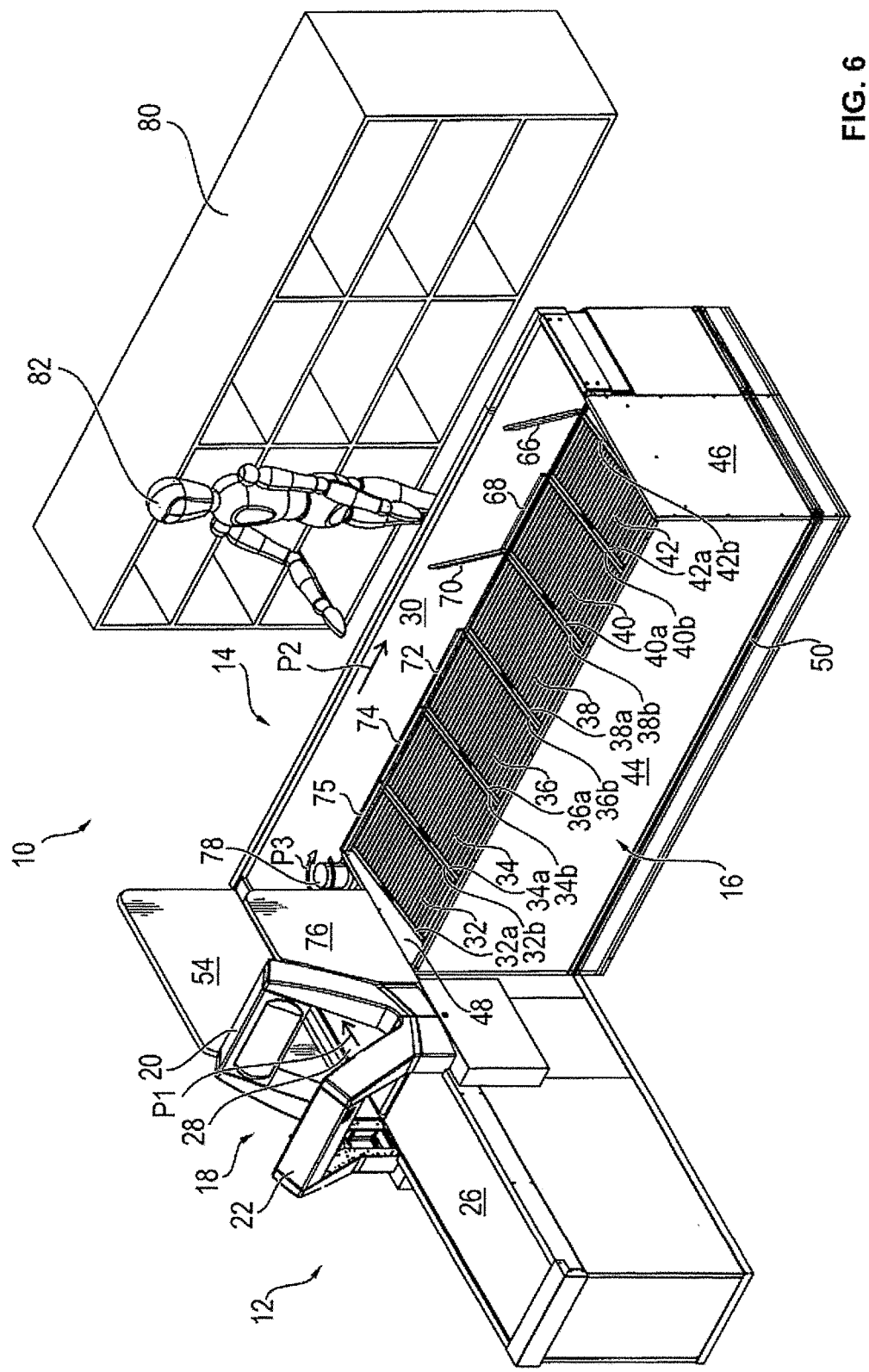
FIG. 6 is a perspective illustration of the checkout-system arrangement of FIGS. 1 to 5, together with a schematically illustrated customer-service operator and a rack.

FIG. 6 shows the perspective illustration of the checkout system 10 as per FIG. 5, together with a schematically illustrated customer-service operator 82 and a rack 80 which is arranged at a distance from the conveying device 14, wherein the customer-service operator 82 is located in the region between the rack 80 and the conveying device 14. The customer-service operator 82 supervises both the automatic item acquisition by means of the scanning unit 18, checks that all items are acquired by the scanning unit 18, in particular that no items remain behind in a shopping cart, if required manually re-acquires items which have not been acquired by the scanning unit, for example by means of the hand-held scanner 56, and handles the payment procedure with the customer. Alternatively to the customer-service operator 82 and manual handling of payments, in other embodiments checkout systems may also comprise self-service stations for handling the payment transaction. A variant in which the customer-service operator does assist or supervise the payment procedure and, for example, also hands over the checkout receipt to the customer but in which the actual handling of cash or electronic payment procedure is handled by the customer himself/herself at a corresponding terminal is also conceivable.

Figure 7:
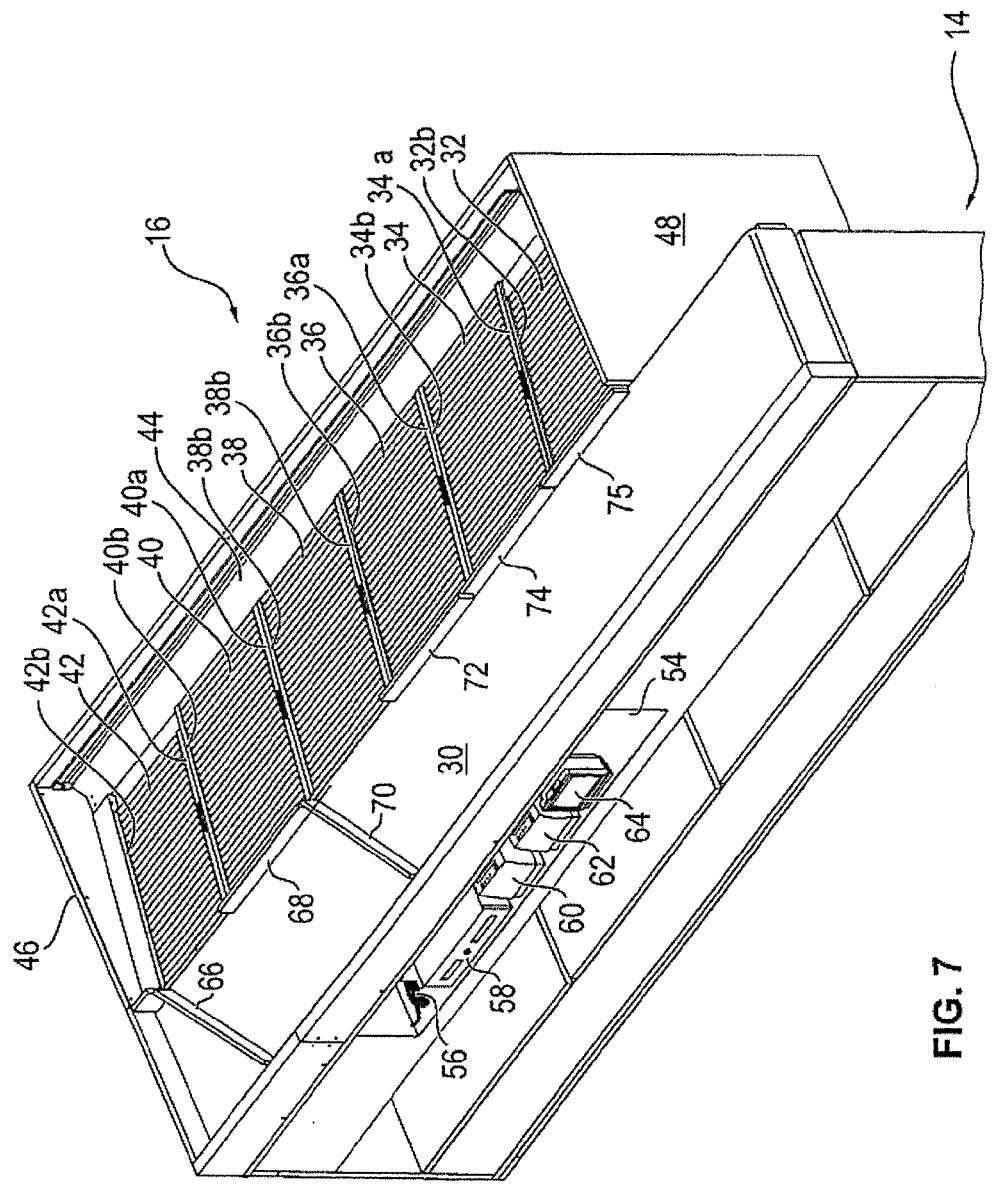
FIG. 7 is a conveying device and a packing device of the checkout-system arrangement of FIGS. 1 to 6.

In FIG. 7 a perspective illustration of the conveying device 14 and of the packing device 16 of the checkout system 10 is shown.

Figure 8:
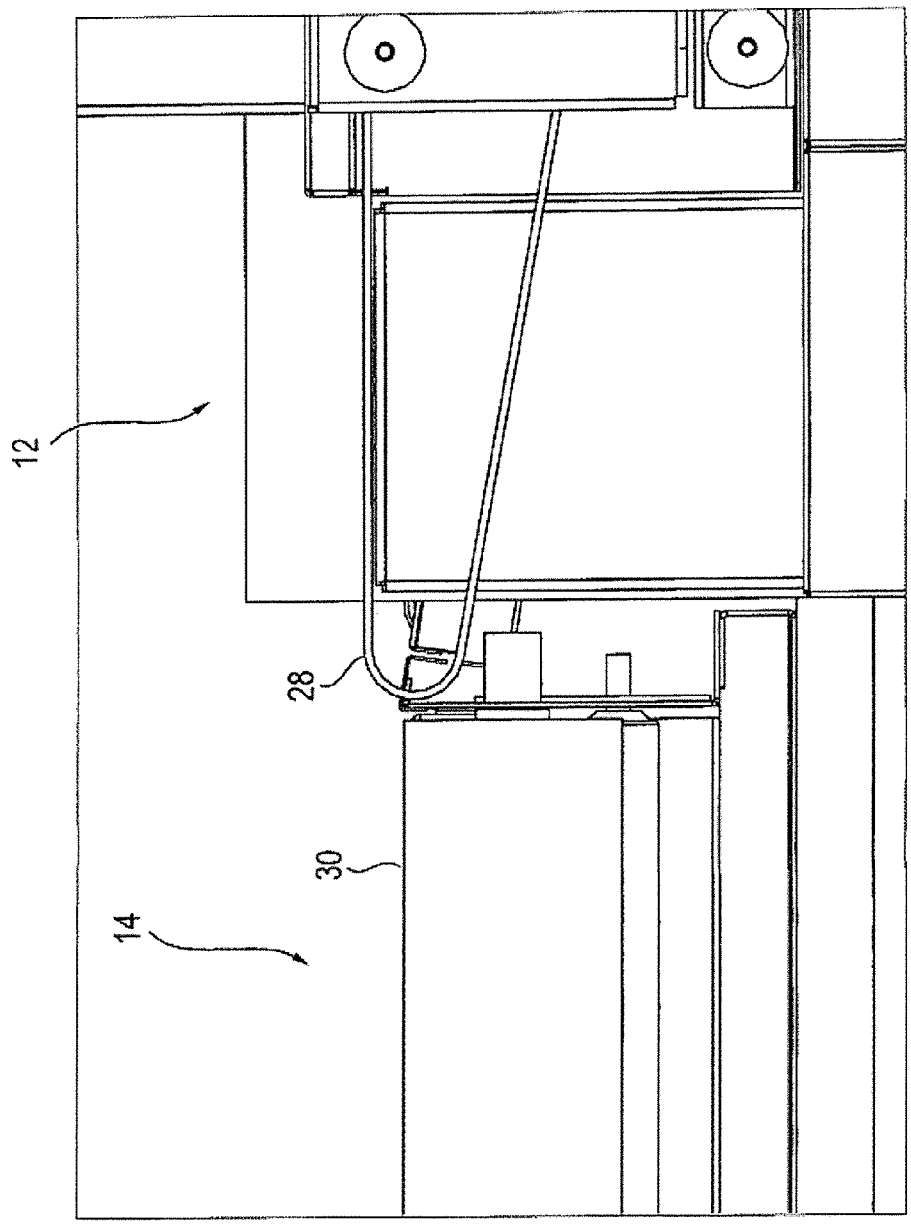
FIG. 8 is a detailed view of a detail of the transition region from the conveyor belt of an item-acquisition device to the conveyor belt of a conveying device of the checkout-system arrangement of FIGS. 1 to 7.

In FIG. 8 a detail of the transition from the return belt 28 to the conveyor belt 30 is illustrated. As is readily visible in this detail view, the conveying plane of the return belt 28 is higher than the conveying plane of the conveyor belt 30. It is particularly advantageous if, as is shown in FIG. 8, the height differential corresponds to the sum of the radius of a deflection roller (not illustrated) of the return belt 28, in the transition region between the return belt 28 and the conveyor belt 30, and the wall thickness of the conveyor belt 28. On account thereof the point of the return belt 28 that is closest to the conveyor belt 30 lies level with the conveying plane of the conveyor belt 30, such that a very small gap can be provided thereby between the return belt 28 and the conveyor belt 30 in the transition region between these conveyor belts 28, 30. On account thereof the probability of items making their way into this gap and causing a backlog of items or being damaged is reduced.

Figure 9:
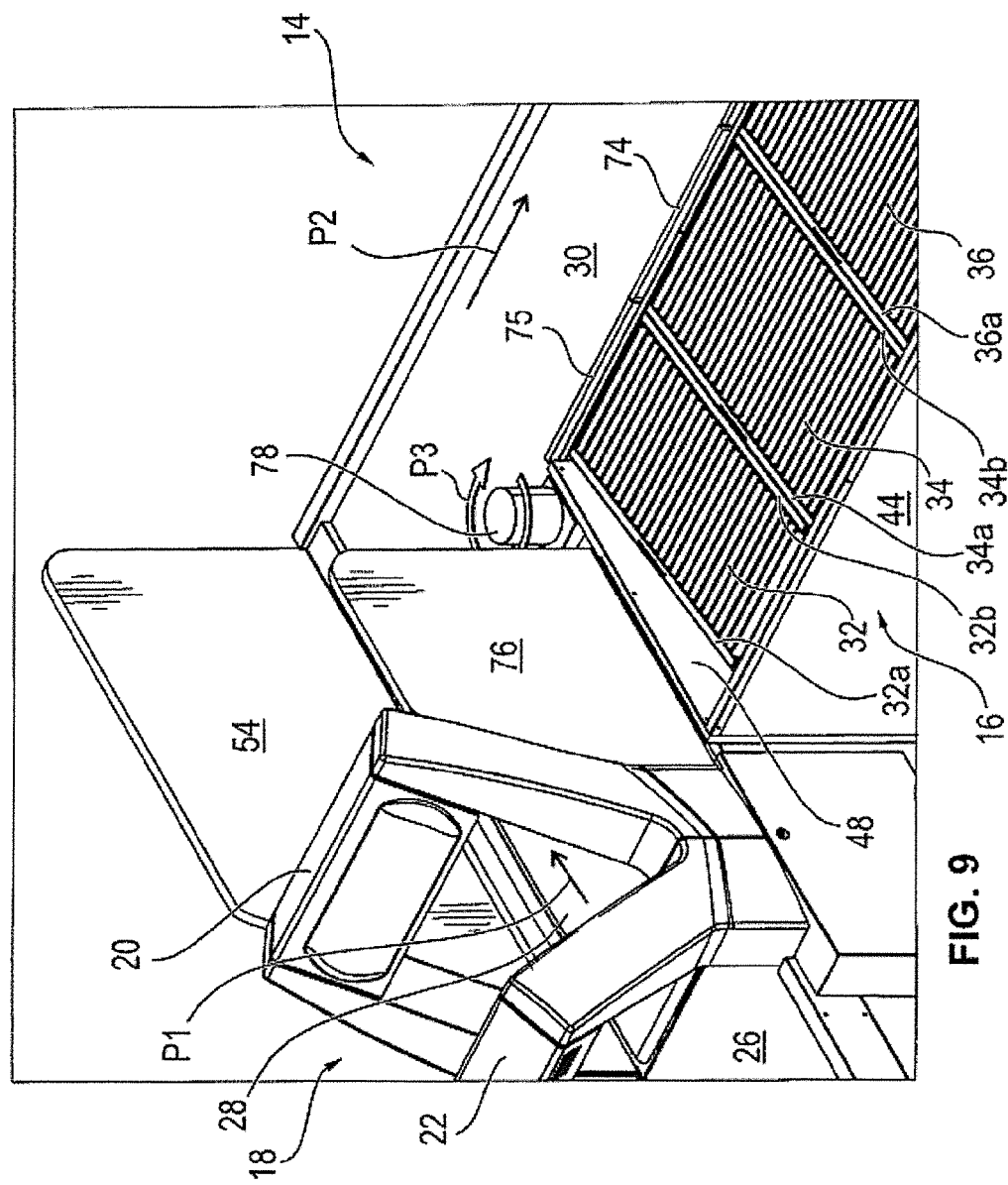
FIG. 9 is a perspective illustration of the transition region between the first conveyor belt and the second conveyor belt of FIG. 8.

In FIG. 9 a perspective illustration of a detail of the transition region between the return belt 28 and the conveyor belt 30, together with the roller 78, is illustrated.

Figure 10:
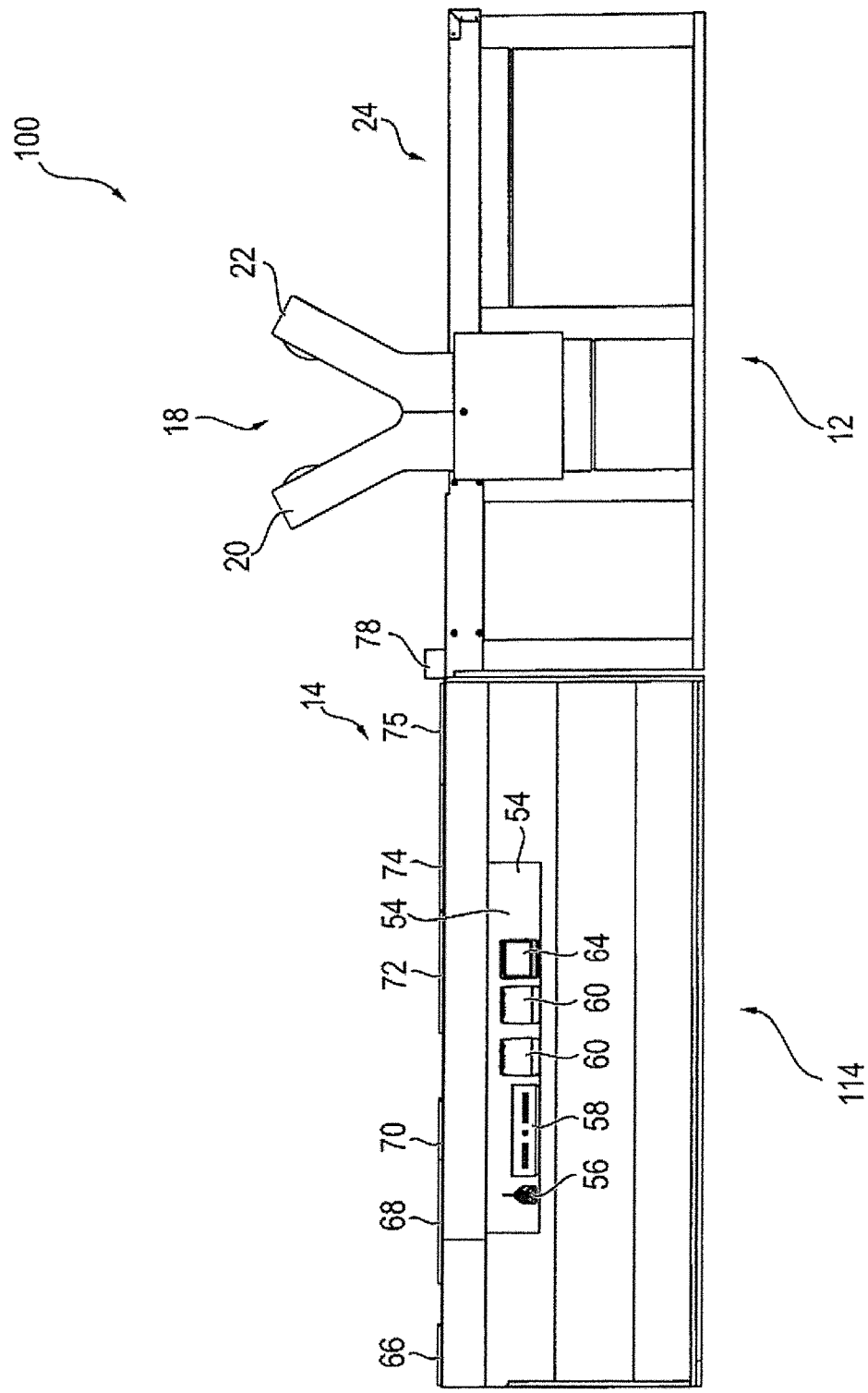
FIG. 10 is a side view of a checkout-system arrangement according to a second embodiment.

FIG. 10 shows a side view of a checkout-system arrangement 100 according to a second embodiment. The checkout-system arrangement 100 comprises the same elements of the checkout-system arrangement 10 of FIG. 1, wherein the leader belt 26, the return belt 28 and a conveyor belt 130 of a conveying device 114 are arranged behind one another.

The conveying device 114 differs from the conveying device 14 according to the first embodiment only in the length of the conveyor belt 130. The length of the conveyor belt 130 is shorter than the length of the conveying path 30 of the first embodiment by the width of the return path 28. Furthermore, in this second embodiment the deflection roller 76 can could be dispensed with. Those elements of the checkout-system arrangement 100 according to the second embodiment that correspond to the first embodiment are identified with the same reference signs. In contrast to the first embodiment the separation elements 52, 74 have been dispensed with. In the case of other embodiments, however, lateral separation elements 52, 74, in particular laterally beside the return conveyor, may be provided also in the case of the conveyor belts 26, 28, 30 being arranged behind one another.

Figure 11:
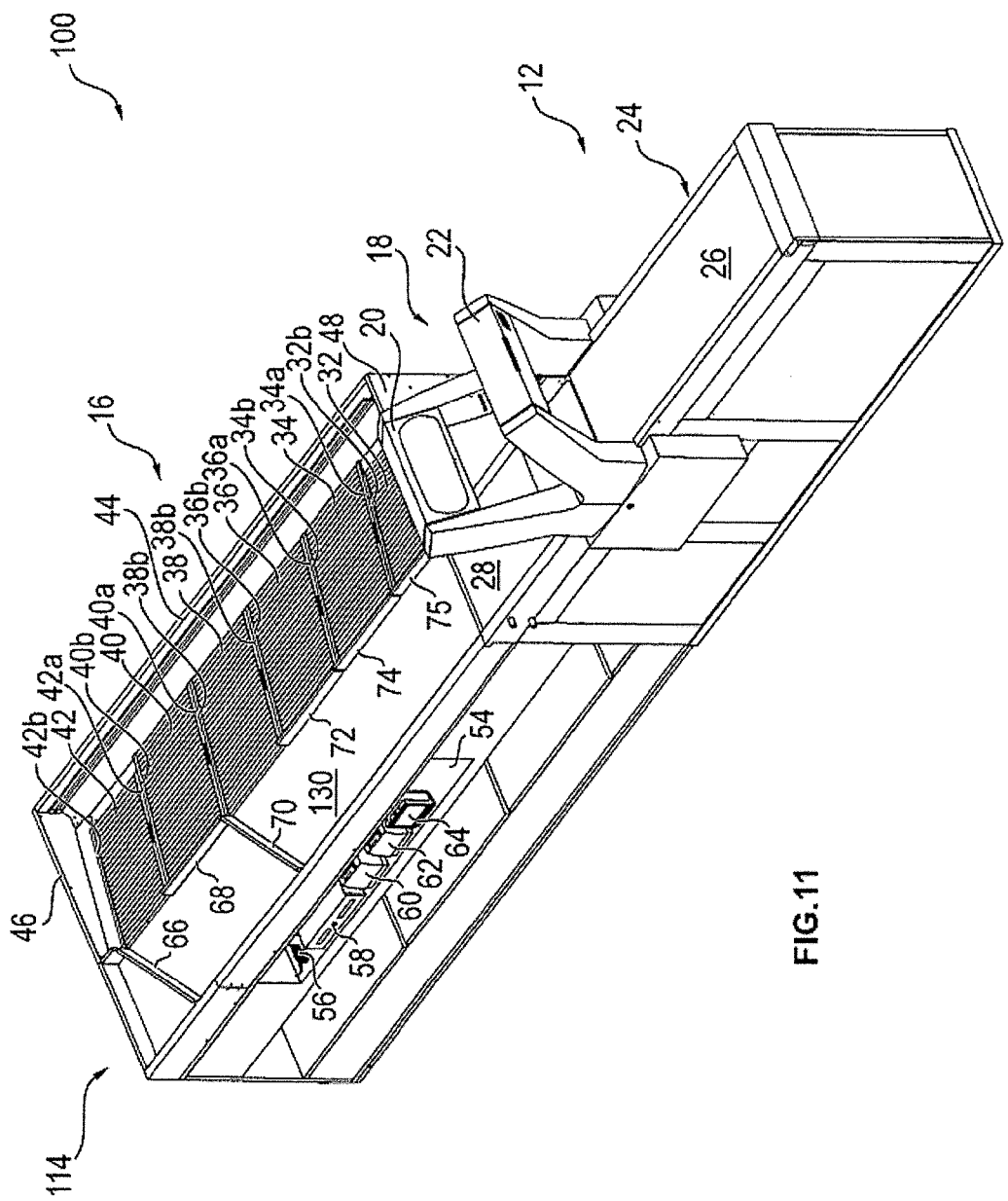
FIG. 11 is a perspective illustration of the checkout-system arrangement of FIG. 10.

FIG. 11 shows a perspective illustration of the checkout-system arrangement 100 of FIG. 10.

LIST OF REFERENCE SIGNS 10, 100 Checkout-system arrangement
12 Item-acquisition device
14, 114 Conveying device
16 Packing device
18 Scanning unit
20, 22 Scanner
24 Infeed region
26 Leader belt
28 Return belt
30, 130 Conveyor belt
P1, P2 Conveying direction
32 to 42 Item-receiving unit
32a, 32b, 34a, 34b, 36a, 36b. 38a, 38b, 40a, 40b, 42a, 42b Separation wall
44, 46, 48 Connecting elements
50 Impact bar
52, 76 Separation element
54 Compartment
56 Hand-held scanner
58 Checkout drawer
60 Receipt printer
62 Coupon printer
64 Display unit
66 to 74 Turnout element
78 Rotatable roller
P3 Rotation direction
80 Rack
82 Operator

The invention claimed is:

1. A checkout-system arrangement, comprising:
an item-acquisition device (12) for acquiring selected items, the item-acquisition device (12) having a scanner (18, 20, 22) with a scanning region for acquiring the items and a first conveyor belt (28) for conveying the items located on the first conveyor belt (28) at least out of the scanning region of the scanner (18, 20, 22) along a scanned item receiving direction (P1),
a conveying device (14, 114) provided substantially adjacent to a downstream end of the first conveyor belt (28), the conveying device (14, 114) having a second conveyor belt (30, 130) that receives scanned items conveyed by the first conveyor belt (28) and conveys the scanned items along a scanned item delivery direction (P2), and
a packing device (16) arranged along one lateral side of the conveying device (14, 114) and having at least two item-receiving units (32 to 42) that are adjacent to one another in the scanned item delivery direction (P2), the item-receiving units (32 to 42) being selectively combinable with one another and with the conveying device (14, 114) and being selectively separable from one another and from the conveying device (14, 114), the item-receiving units (32 to 42) having downwardly sloped delivery surfaces for receiving the scanned items and for delivering the items to a customer in directions substantially normal to the scanned item delivery direction (P2).

2. The check-out system arrangement of claim 1, wherein the item-acquisition device (12), the packing device (16) and the conveying device (14, 114) are configured as separate modules that are selectively combinable with one another and selectively separable from one another.

3. The checkout-system arrangement of claim 2, wherein the modules (12, 14, 16) are interconnectable with one another by way of releasable and reinstatable connectors by means of provided interfaces that include at least one connecting element (44) extending parallel to the scanned item delivery direction (P2) and connecting to ends of the item-receiving units (32 to 42) remote from the conveying device (14, 114).

4. The checkout-system arrangement of claim 1, wherein an orientation of the conveying device (14, 114) relative to the item-acquisition device (12) is modifiable for modifying the orientation of the scanned item delivery direction (P2) relative to the scanned item receiving direction (P1).

5. The checkout-system arrangement of claim 4, wherein in a first operating position, the item-acquisition device (12) and the conveying device (14, 114) are arranged so that the scanned item receiving direction (P1) and the scanned item delivery direction (P2) are identically oriented.

6. The checkout-system arrangement of claim 5, wherein in a second operating position, the item-acquisition device (12) and the conveying device (14, 114) are arranged in such a manner that the scanned item receiving direction (P1) and the scanned item delivery direction (P2) are orthogonal to one another.

7. The checkout-system arrangement of claim 6, wherein the item-acquisition device (12) and the conveying device (14, 114) form an internal corner in the second operating position, and the lateral side of the conveying device (14, 114) along which the packing device (16) is arranged defines part of the internal corner.

8. The checkout-system arrangement of claim 1, the scanner (18, 20, 22) is a tunnel scanner.

9. The checkout-system arrangement of claim 1, wherein the first conveyor belt (28) and the second conveyor belt (30, 130) are arranged relative to one another so that the scanned item delivery direction (P2) is substantially orthogonal to the scanned item receiving direction (P1) to partially overlap in a transition region in which the items are transferred from the first conveyor belt (28) to the second conveyor belt (30, 130).

10. The checkout-system arrangement of claim 1, wherein the item-acquisition device (12) and the conveying device (14, 114) are arranged so that longitudinal axes of the first conveyor belt (28) and of the second conveyor belt (130) are oriented identically, and wherein the scanner (18, 20, 22) is arranged at an end of the first conveyor belt (28), so that the items, immediately after acquisition by the scanner (18, 20, 22), are transferred from the first conveyor belt (28) to the second conveyor belt (30).

11. The checkout-system arrangement of claim 1, further comprising a rack (80) on a first longitudinal side of the conveying device (14, 114), and the packing device (16) be arranged on a second side of the conveying device (14, 114) that is opposite the first side.

12. A checkout-system arrangement, comprising:
an item-acquisition device (12) for acquiring selected items, the item-acquisition device (12) having a scanner (18, 20, 22) with a scanning region for acquiring the items and a first conveyor belt (28) for conveying the items located on the first conveyor belt (28) at least out of the scanning region of the scanner (18, 20, 22) along a scanned item receiving direction (P1),
a conveying device (14, 114) provided substantially adjacent to a downstream end of the first conveyor belt (28), the conveying device (14, 114) having a second conveyor belt (30, 130) that receives scanned items conveyed by the first conveyor belt (28) and conveys the scanned items along a scanned item delivery direction (P2), and a packing device (16) arranged along one lateral side of the conveying device (14, 114) and having at least two item-receiving units (32 to 42) that are adjacent to one another in the scanned item delivery direction (P2), the item-receiving units (32 to 42) being configured for receiving the scanned items and making the scanned items available to a customer, wherein the at least two item-receiving units (32 to 42) of the packing device (16) are separated from one another by a movable separation wall (32a, 32b, 34a, 34b, 36a, 36b, 38a, 38b, 40a, 40b, 42a, 42b), and wherein a receiving volume of the item-receiving units (32 to 42) is modifiable by moving the separation wall (32a, 32b, 34a, 34b, 36a, 36b, 38a, 38b, 40a, 40b, 42a, 42b).

13. A checkout-system arrangement, comprising:

an item-acquisition device (12) for acquiring selected items, the item-acquisition device (12) having a scanner (18, 20, 22) with a scanning region for acquiring the items and a first conveyor belt (28) for conveying the items located on the first conveyor belt (28) at least out of the scanning region of the scanner (18, 20, 22) along a scanned item receiving direction (P1), a conveying device (14, 114) provided substantially adjacent to a downstream end of the first conveyor belt (28), the conveying device (14, 114) having a second conveyor belt (30, 130) that receives scanned items conveyed by the first conveyor belt (28) and conveys the scanned items along a scanned item delivery direction (P2), and a packing device (16) arranged along one lateral side of the conveying device (14, 114) and having at least two item-receiving units (32 to 42) that are adjacent to one another in the scanned item delivery direction (P2), the item-receiving units (32 to 42) being configured for receiving the scanned items and making the scanned items available to a customer, wherein the first conveyor belt (28) and the second conveyor belt (30, 130) are arranged relative to one another in such a manner that the scanned item delivery direction (P2) is substantially orthogonal to the scanned item receiving direction (P1), and in a transition region in which the items are transferred from the first conveyor belt (28) to the second conveyor belt (30), an upper surface of the second conveyor belt (30) is lower than and substantially parallel to an upper surface of the first conveyor belt (28), a region of the first conveyor belt (28) downstream of the scanner (18, 20, 22) being curved around an axis that is substantially parallel to the scanned item delivery direction (P2) and substantially coplanar with the upper surface of the second conveyor belt (30).

14. The checkout-system arrangement claim 13, wherein the first conveyor belt (28) and the second conveyor belt (30, 130) are transversely arranged relative to one another, and wherein in a transition region inside an internal angle formed by the conveyor belts (18, 30), at least one roller (78) having an axially fixed longitudinal axis aligned vertically and projecting upward from the conveyor belts, the at least one roller being rotatable about the longitudinal axis for deflecting the items during transfer from the first conveyor belt (28) to the second conveyor belt (30).

* * * * *